M. W. MOREHOUSE.
TESTING MECHANISM.
APPLICATION FILED MAY 7, 1913.

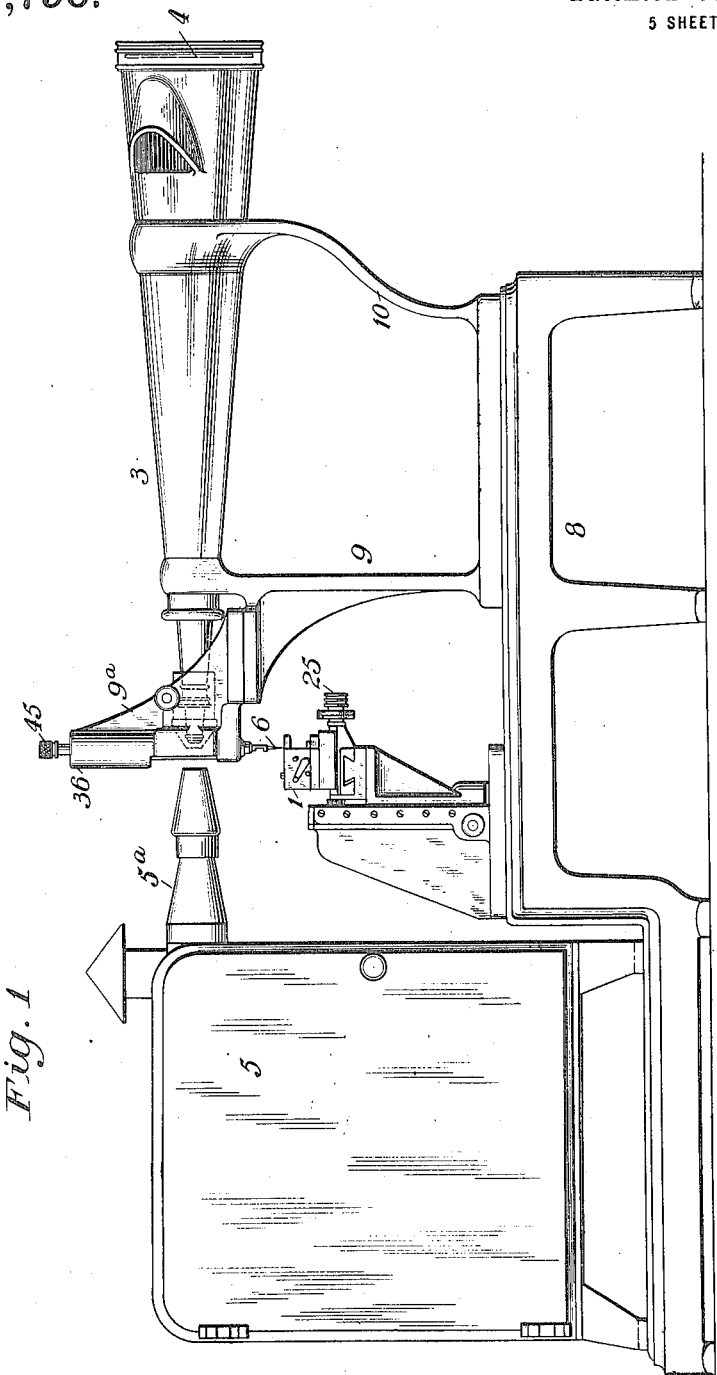

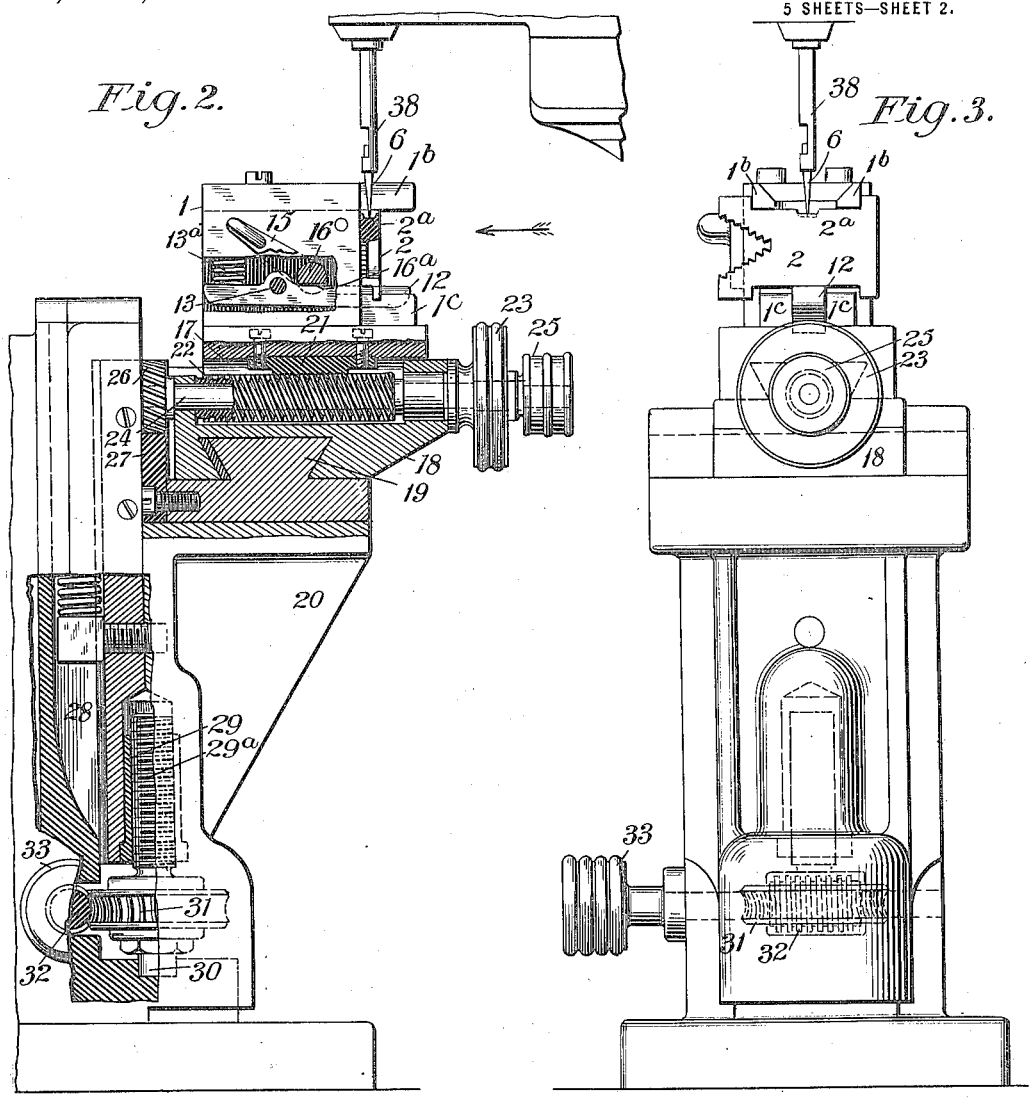

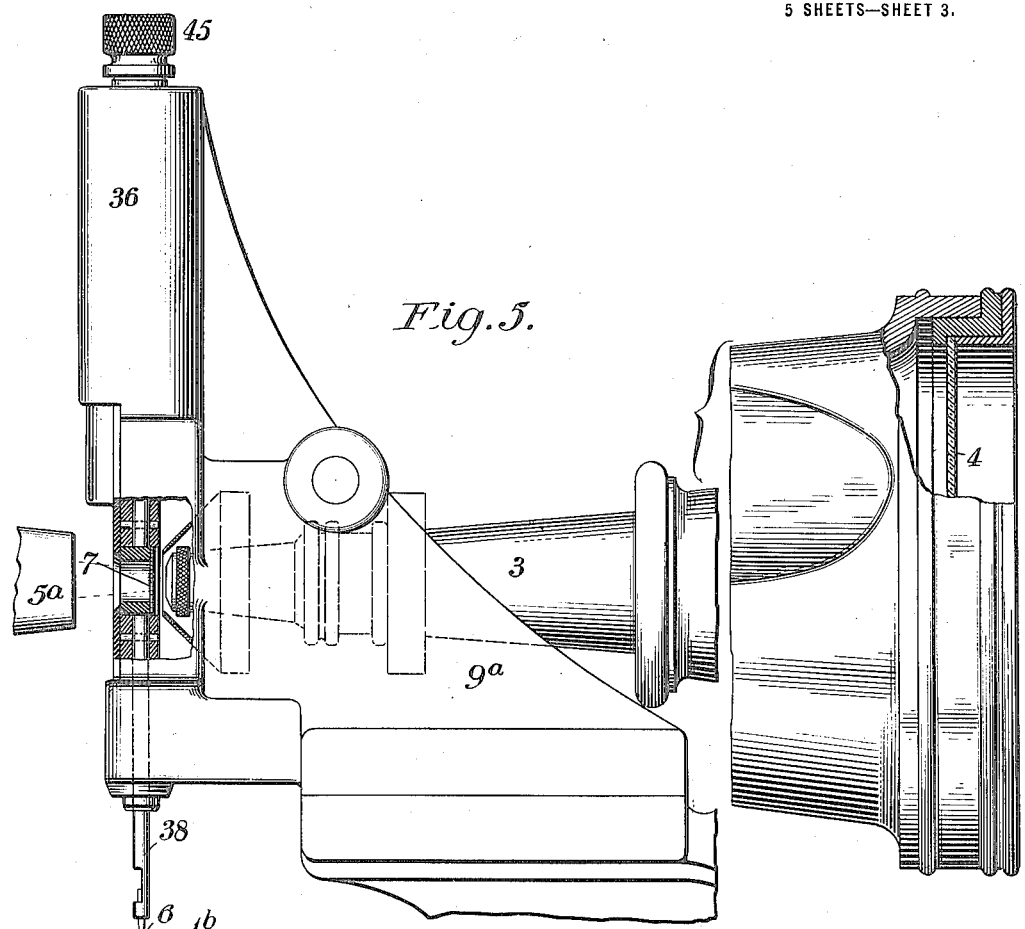
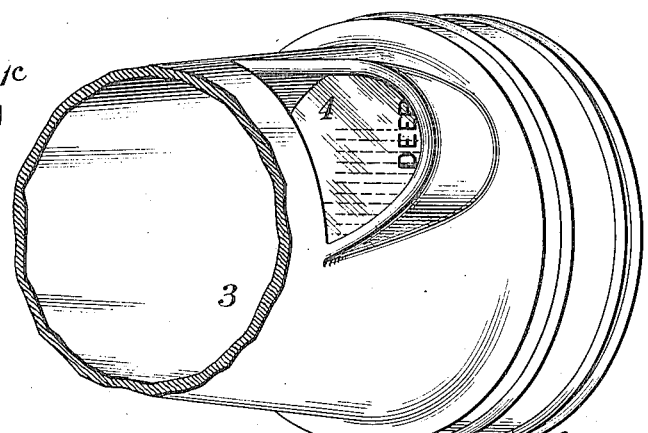

1,157,796.

Patented Oct. 26, 1915.
5 SHEETS—SHEET 4.

WITNESSES:
M. R. Manning
A. Lawson

INVENTOR.
M. W. Morehouse
BY
Rogers, Kennedy Campbell ATTORNEYS.

M. W. MOREHOUSE.
TESTING MECHANISM.
APPLICATION FILED MAY 7, 1913.
1,157,796.
Patented Oct. 26, 1915.
5 SHEETS—SHEET 5.
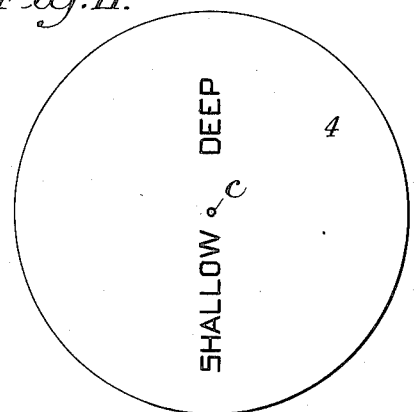
Fig.11.
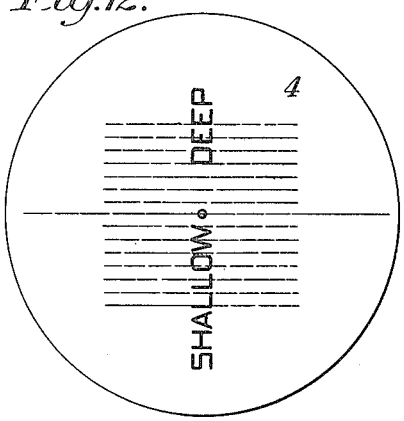
Fig.12.
Fig.9.
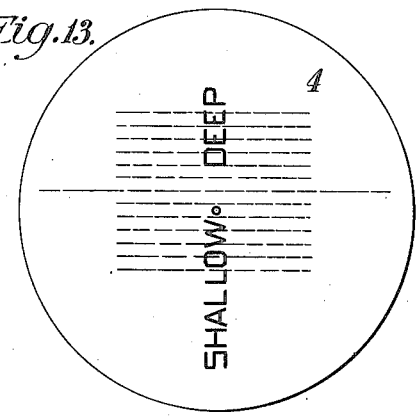
Fig.13.
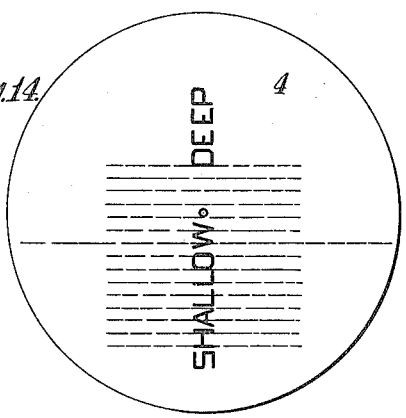
Fig.14.
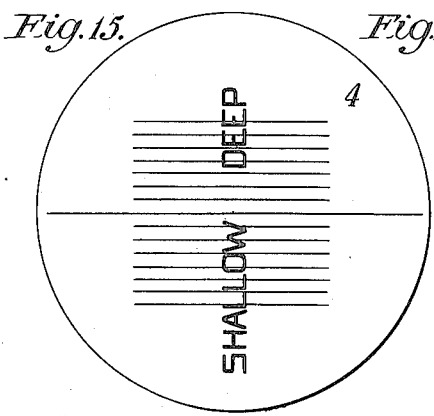
Fig.15.
Fig.10.
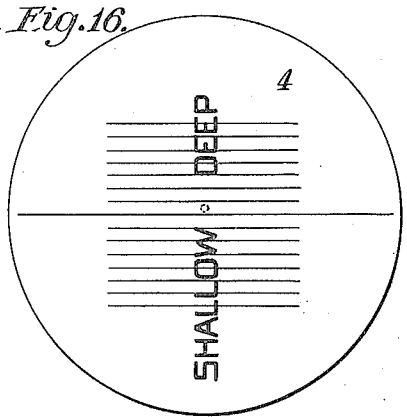
Fig.16.
WITNESSES:
INVENTOR.
M. W. Morehouse
BY
Rogers, Kennedy & Campbell
ATTORNEYS.

ated Oct. 26, 1915.
UNITED STATES PATENT OFFICE.

MELVIN W. MOREHOUSE, OF BROOKLYN, NEW YORK, ASSIGNOR TO MERGENTHALER LINOTYPE COMPANY, A CORPORATION OF NEW YORK.

TESTING MECHANISM.

1,157,796.  Specification of Letters Patent.   Patented Oct. 26, 1915.

Application filed May 7, 1913. Serial No. 766,063.

*To all whom it may concern:*

Be it known that I, MELVIN W. MOREHOUSE, a citizen of the United States, residing at Brooklyn, in the county of Kings and State of New York, have invented certain new and useful Improvements in Testing Mechanism, of which the following is a specification, reference being had therein to the accompanying drawing.

This invention relates to an apparatus for testing the precision and accuracy of surfaces, and is designed with special reference for use in the typographic art in connection with type matrices to test the face of the character in the matrix body.

As is well-known to those skilled in the art, extreme precision and accuracy are demanded in the location of the character-matrix in the matrix body, and as the characters are comparatively small, I propose, in accordance with my invention, to provide in combination with a feeler adapted to explore or contact with the surface to be tested, a means for displaying in magnified scale the relative positions of the feeler due to variations in the surfaces being tested. I prefer to employ for this purpose a projectoscope or similar instrument, and to so arrange the feeler that in the operation of exploring the surface, it will interpose an indicating mark in the axis of the projectoscope, the image of which indicating mark will be projected in magnified scale on the screen of the projectoscope, so that by observing the position of the projected image on the screen, the accuracy or inaccuracy of the surface being tested may be determined.

Figure 7:
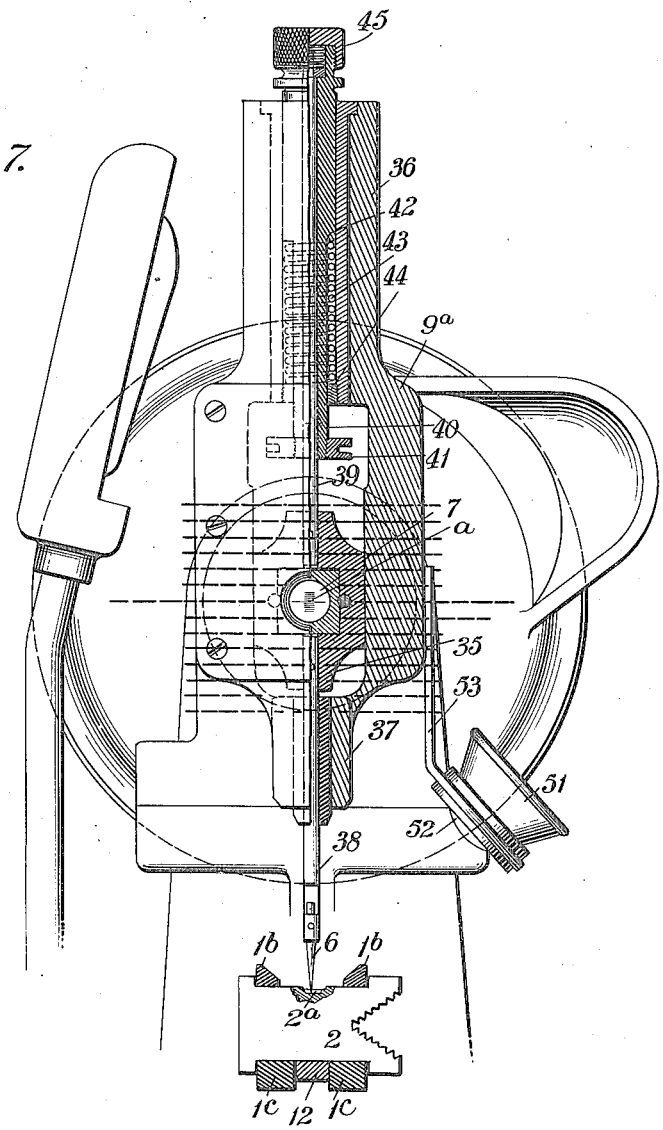
Figure 8:
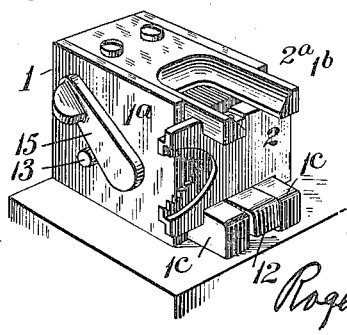

In the accompanying drawings: Figure 1 is a side elevation of my improved apparatus complete, the same comprising a holder for the object to be tested, a feeler, and a projectoscope. Fig. 2 is a side elevation, partly in section, of the holder and matrix on an enlarged scale, showing the feeler in contact with the surface to be tested. Fig. 3 is an elevation of the parts shown in Fig. 2, as viewed in the direction of the arrow in Fig. 2. Fig. 4 is a top plan view of the same, partly in section. Fig. 5 is a side elevation, partly in section, of the projectoscope, the feeler, and the parts associated with the feeler, the feeler being shown in operative position relative to the character-matrix. Fig. 6 is a broken perspective view of the screen-end of the projectoscope, showing the hooded opening through which the screen may be observed. Fig. 7 is a view, partly in elevation and partly in section, of the feeler and associated parts shown in Fig. 5. Fig. 8 is a perspective view of the matrix holder, showing a matrix clamped in position. Fig. 9 is an elevation of the feeler-actuated slide, showing the same provided with an indicating mark, the image of which is adapted to be projected on the screen. Fig. 10 is a similar view of the slide with a different form of indicating mark. Figs. 11, 12, 13 and 14 are views of the projectoscope screen, showing the same provided with an index mark in connection with which the projected image on the slide is adapted to be read. Figs. 15 and 16 are plan views of the screen, showing the same provided with an index mark of a different form from what is disclosed in Figs. 11 to 14.

In the accompanying drawings: The form of the apparatus illustrated is designed particularly for use in connection with linotype matrices for determining as to the accuracy of the depth to which the character-matrix is sunk. But it will be manifest to those skilled in the art that the apparatus may be modified or changed within the skill of the mechanic to adapt the same for testing other objects and surfaces without departing from the limits of my invention; and it will be further understood that the invention is not limited to any particular form or construction of the parts, except in so far as such limitations are specified in the claims.

As shown in Fig. 1, which illustrates the complete apparatus, 1 represents a holder for the object to be tested, in the present instance of a form and construction to fixedly hold in predetermined position a linotype matrix 2, so as to present its sunken matrix character $2^a$ uppermost, as shown in Figs. 2 and 3.

3 represents a projectoscope having the usual projecting lens (not shown), and having a screen 4 on which the image of the indicating mark is adapted to be projected.

5 represents a suitable light or lantern provided with the usual condenser tube $5^a$ arranged in line with the axis of the projectoscope and by which the light rays are concentrated on the indicating mark to be projected.

6 represents a feeler, in the present instance in the form of a pointed pin or stylus which is vertically movable so that it may be adjusted in contact with the surface of the character.

7 represents a vertical transparent slide connected to and movable with the feeler, as will be more fully described hereinafter and arranged between the end of the condenser tube of the lantern and the end of the projectoscope tube, on which slide an indicating mark 7a in the form of spaced lines is imposed, the image of which will be projected on the screen in magnified form so that its position relative to an index mark c on the screen may be readily observed, as will be more fully described hereinafter.

The foregoing parts are suitably supported on a fixed frame or base 8, the projectoscope being fixedly mounted in horizontal position in the upper ends of two upright arms 9 and 10 rising from the base, and the front arm 9 being provided with a forwardly extending bracket arm 9a in which the feeler and its connected slide is sustained and guided. The matrix holder is sustained on a standard 11 rising from the base, and is so mounted that it may be moved and adjusted both longitudinally and transversely of the feeler, and also vertically with relation thereto.

The matrix holder, as shown more particularly in Figs. 2, 3, 4 and 8, comprises a block 1a provided at its upper end with a pair of fixed forwardly projecting alining fingers 1b, 1b, and at its base with a pair of fixed forwardly projecting positioning fingers 1c, 1c, between which pairs of fingers the matrix is positioned and alined flatly against the vertical face of the block with the character uppermost, the upper fingers bearing against the usual "upper" and "lower" shoulders at one side of the matrix, and the lower fingers bearing against "upper" and "lower" shoulders at the opposite side of the matrix. The matrix is held firmly in position and its edge containing the character pressed upwardly against the under faces of the alining fingers, by means of a clamping finger 12 mounted on a horizontal transverse stud 13 in a recess in the block, one end of the finger projecting outwardly beyond the face of the block between the positioning fingers, and the other end of the clamping finger being acted on by a spring 13a mounted within the block, the upper end of which bears against the top of the block and the lower end against the clamping finger, and which spring tends to urge the projecting active end of the finger upwardly. The projecting end of the finger is adapted to bear against the under edge of the matrix and force the same tightly and snugly to its seat in alined position against the fingers 1b, 1b. In order to permit the matrix to be conveniently set in position between the fingers and also to permit it to be readily removed therefrom, a lever 15 is provided at the side of the block and connected with the end of a horizontal transverse shaft 16 mounted in the block and extending above the clamping finger forward of its pivoting stud. The shaft is provided with a flat cam surface 16a, of such form and so related to the clamping finger that when the shaft is in the position shown in Fig. 2, the cam surface will extend parallel with the finger and the latter will be pressed by its spring upwardly against the lower edge of the matrix and will hold the same firmly in position. When, however, the lever 15 is depressed to turn the shaft it will force the edge of the cam surface against the clamping finger, and the latter will be lowered at its front end and the matrix will be released.

The foregoing construction constitutes a simple and effective means for holding a matrix or other object to be tested fixedly in position, and for permitting it to be readily set in place or removed, but it is manifest that other forms of holding means may be employed, according to the conditions encountered in practice.

The block 1a is mounted to slide back and forth in guides 17, 17, in a carriage or slide 18, which is provided in its under side with a transverse dove-tail groove adapted to receive a dove-tail rib 19 projecting upwardly from a horizontal bracket 20 mounted on the standard 11 before alluded to.

Fixed to the under side of the block is a rack 21 engaged by a threaded fore and aft extending adjusting sleeve 22, mounted to turn in the carriage 18, and having a head 23 fixed to its end for turning it, so that by the rotation of the sleeve, the block may be adjusted horizontally in a fore and aft direction. Mounted within the threaded sleeve and rotatable independently thereof, is a stem 24 whose outer end is provided with a head 25 for turning it, and whose inner end is provided with a pinion 26 meshing with a transverse rack 27 on the bracket 20, so that by turning the stem, the carriage may be moved transversely along the bracket so as to adjust the matrix holder in the corresponding direction.

The bracket 20 is mounted to move up and down in suitable vertical guides 28, 28, on the standard 11, and is provided in its lower end with a vertical internally threaded sleeve 29 in which is screwed a threaded stem 29a provided on its lower end with a stud 30 mounted in a bearing in the standard. The stem has fixed to it a worm wheel 31 engaged by a horizontal worm 32 mounted in bearings in the standard and provided at one end with a head 33 for turning it, so that by rotating the worm, the stem will be correspondingly rotated and will act to raise or lower the bracket on the standard and effect a corresponding adjustment of the matrix-holding block.

By means of the mechanism described, the matrix-holding block may be moved and adjusted independently in three directions relatively to the feeler; first, in a fore and aft direction controlled by the threaded sleeve 22; second, in a transverse direction controlled by the stem 24; and third, in a vertical direction controlled by the worm 32.

The slide 7 before alluded to is fixed in a block or frame 35 mounted and guided vertically in the bracket 9ª, which at its upper end is extended vertically in the form of a tubular head 36 and at its lower end is extended downwardly in the form of a tubular bearing 37. The feeler 6 is carried on the lower end of a rod 38 extending upwardly loosely through the bearing 37 and fixed at its upper end to the slide-carrying block 35, and as the slide is fixedly mounted in the block, the feeler, the rod, the slide and the block will form in effect a single structure in which the slide will move with the feeler. The upper end of the block 35 has connected with it the lower end of a rod 39 extending within a sleeve 40 mounted in the tubular head 36, the rod being adjustably clamped in the sleeve by means of a clamping nut 41 threaded on the lower split end of the sleeve, as shown more particularly in Fig. 7. Within the tubular head the lower portion of the sleeve 40 is reduced in diameter, forming an annular shoulder 42, and the reduced portion of the sleeve is encircled by a spiral spring 43, whose upper end bears against the shoulder 42 and whose lower end bears against a collar 44 loosely encircling the sleeve and fixed in the lower end of the head, said spring serving to yieldingly sustain the sleeve and parts connected therewith. At its upper end the sleeve has a head 45 fixed thereto, by means of which it may be moved up and down in setting and manipulating the feeler with reference to the surface being tested.

As before stated, both the slide 7 and screen 3 are provided respectively with an indicating mark and an index mark, the image of the mark on the slide being adapted to be projected in magnified scale on the screen, and to be read in connection with the index mark thereon in determining as to the accuracy of the surface being tested.

The index mark on the screen will occupy a fixed position relative to the movable slide, and as the position of the slide will be controlled by the surface being tested, the accuracy or inaccuracy of the surface will be indicated in a graphic and exaggerated degree by the relation which the projected image will bear to the index mark on the screen.

Various forms of indicating marks and index marks may be applied to the slide and screen respectively, and in Figs. 9, 10, 11 and 15, I have shown two different forms. In Fig. 9 the slide is shown as being provided with an indicating mark consisting of a number of horizontal lines $a$ arranged one above the other equal distances apart, with a longer centrally located horizontal line $b$ indicating the center of the field of the shorter lines. In Fig. 11, the screen is shown provided with an index mark $c$ in the form of a centrally located circle in connection with which the projected image of the indicating mark is adapted to be read in its different relations thereto, as shown for instance in Figs. 12, 13 and 14. In Fig. 12 the image of the projected lines $a$ are shown superposed in a symmetrical central position with reference to the index mark $c$, with the long central line coincident with the index mark, this relation of the image and index mark indicating the precision and correctness of the surface being tested, when the feeler is set in contact with said surface, as shown in Fig. 7. In Fig. 13 the projected image of the field of lines appears on the screen at a higher level than in Fig. 12, the central line of the field being above the index mark on the screen, and this relation indicates that the surface with which the feeler contacts is at a different level from that of the surface indicated by the projected image in Fig. 12. In Fig. 14 the center of the field of lines is shown projected below the index mark $c$ on the screen, this relation indicating also a different level of the surface being tested than was indicated in Fig. 12.

The character of markings described are designed with special reference to the use of the instrument in testing matrices of the form shown, to determine if the character matrix is sunk to the proper depth below the edge of the matrix body; and in order that the operator may know at a glance, in the event that the character is not at its proper depth, whether it is too deep or too shallow, the screen has applied to it respectively above and below the index mark $c$, the captions "Deep" and "Shallow." If the surface of the character-matrix is deeper than it should be, the feeler will move farther down in effecting contact with the surface than it would if the surface were of the proper depth, and carrying the slide with it, the projected image on the screen will appear with the central line $b$ above the index mark $c$ of the screen, as shown in Fig. 13, so that the operator by observing that the central line $b$ is projected on the screen on the side of the index $c$ marked "Deep," knows at once that the character is sunk too deep. If, on the other hand, the character being tested is too shallow, the feeler in contacting with the surface will move the slide to a higher level, and the projected image will appear on the screen as shown in Fig. 14, and the operator by observing that the central line $b$ is on the side of the screen marked "Shallow," knows at once that the character is not sunken to the proper depth.

In Figs. 10, 15 and 16, different forms of indicating marks and index marks are applied respectively to the slide and screen. In this case the slide is provided with an indicating mark in the form of a small circle or point as in Fig. 10, and the index mark on the screen is in the form of horizontal lines, as shown in Fig. 15. The operation, however, is the same, except that instead of the lines being projected on the screen, as described in connection with Figs. 12, 13 and 14, the circle on the slide is projected on the screen, as shown in Fig. 16, so that by observing the relation of the projected circle to the fixed field of lines on the screen, the accuracy in depth of the character may be determined.

In the operation of the apparatus the matrix is held in the holder, with the edge in which the character is sunken, alined against the under faces of the alining fingers, and the holder is so adjusted relatively to the feeler that when the latter is moved down into contact with the surface of the character, the slide with the indicating mark thereon will occupy such position that if the character is accurately positioned in the matrix at the proper depth, the image of the indicating mark on the slide will be superposed on the screen in the position shown in Fig. 12, with the central longitudinal line $b$ of the indicating mark coincident with the index mark $c$ of the screen. The normal adjustment of the parts is secured by employing a matrix in which it is known that the character is sunk to the proper depth, and after the adjustment is secured, as above described, the instrument is in condition to test the characters in other matrices. The matrix being removed from the holder by depressing lever 15, another one is set in place between the fingers and clamped against the alining fingers, as shown in Figs. 1 and 2. The feeler is now moved down so as to cause its point to come into contact with the surface of the character, and the operator observes the screen through a hooded opening 50 in the side of the projectoscope tube in order to ascertain the position of the projected image relative to the index mark on the screen. If the image and index mark appear alined, as in Fig. 12, this indicates that the character is at the proper depth. But if the image is displaced above or below the index mark, as in Figs. 13 and 14, it will be known that the character is not at the proper depth, and also whether it is too deep or too shallow, according to which side of the index mark the projected line $b$ of the image is disposed.

By the employment of an indicating mark in the form of equally spaced lines, the extent of inaccuracy in the surface may be readily computed and the proper corrections made with precision and exactness.

In order that the feeler may be adjusted to the surface of the character with nicety and exactness, I provide an eye-piece 51 containing a magnifying lens 52, which eye-piece is sustained by an arm 53 in such position that the operator may view the surface being tested and the end of the feeler.

Having thus described my invention, what I claim is:

1. In a testing apparatus, the combination of a movable feeler adapted to contact with the surface to be tested and provided with an indicating mark movable with the feeler, a screen having an index mark thereon, and a projectoscope for projecting the image of said indicating mark, on the screen to enable a comparison to be made of the position of the image on the screen relative to said index mark.

2. In a testing apparatus, the combination of a movable feeler adapted to contact with the surface to be tested, a slide movable with the feeler and provided with an indicating mark, a screen, and means for projecting the image of said indicating mark, on the screen.

3. In a testing apparatus, the combination of means for holding the object to be tested, a feeler adapted to contact with the object, one of said parts being movable relatively to the other, and the movable part being provided with an indicating mark, a screen having an index mark thereon, and a projectoscope for projecting the image of said indicating mark, on the screen.

4. In a testing mechanism, the combination of means for fixedly holding the object to be tested, a movable feeler adapted to contact with said object, a slide movable with the feeler and provided with an indicating mark, a fixed screen provided with an index mark, and means for projecting the image of said indicating mark, on the screen.

5. In a testing mechanism, the combination of means for holding the object to be tested, a movable feeler adapted to contact with the same, a projectoscope tube provided with a sight opening therein, a screen adapted to be viewed through said sight opening, and a slide movable with the feeler across the axis of the projectoscope tube, the said slide being provided with an indicating mark, the image of which is adapted to be projected on the screen.

6. In a testing mechanism, the combination of means for holding the object to be tested, a feeler adapted to contact with said object, a slide movable with the feeler and provided with an indicating mark comprising a series of spaced lines, a screen, and means for projecting the image of said indicating mark, on the screen.

7. In a testing mechanism, the combination of means for holding the object to be tested, an upright sustaining head arranged thereover, a slide movable vertically in said head and provided with an indicating mark, a feeler depending from the head and adapted to contact with the object to be tested, a stem extending upwardly from the slide for manipulating the feeler, and a projectoscope arranged with its axis transverse to the plane of the slide.

8. In a mechanism for testing the depth of character matrices in matrix bodies, the combination of means for holding the matrix bodies, a feeler adapted to coöperate with the formative surfaces of the characters, a screen having an index mark thereon, and a projectoscope for displaying on said screen, and in relation to said index mark an image showing the relative position of the feeler to the surfaces of the character matrices in the different matrix bodies.

9. In a testing apparatus, the combination of a movable feeler adapted to contact with the surface to be tested and provided with an indicating mark movable with the feeler, a screen provided with captions indicating different conditions of the surface to be tested, and means for projecting the image of said indicating mark on the screen; whereby, by the relation of the projected image to the captions, the condition of the surface to be tested may be ascertained.

In testimony whereof I have affixed my signature in presence of two witnesses.

MELVIN W. MOREHOUSE.

Witnesses:
RICHARD M. BEDELL,
WALTER S. COE.